Dec. 22, 1936.    R. CRAMER ET AL    2,064,822
EXECUTION DEVICE
Filed April 5, 1934
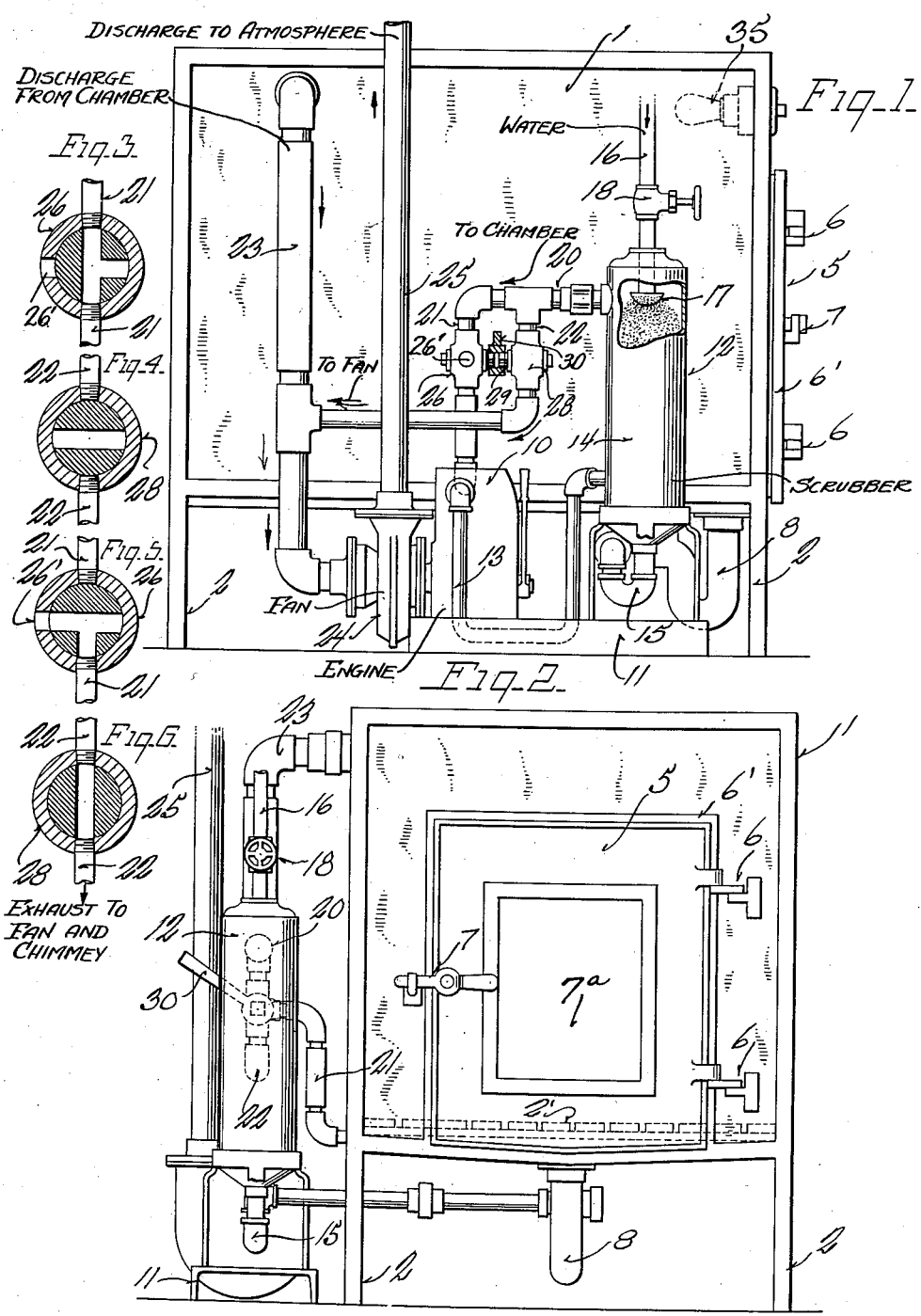
INVENTOR
BY Robert Cramer and August C. Orthwann
ATTORNEYS Patented Dec. 22, 1936

2,064,822

UNITED STATES PATENT OFFICE 2,064,822

EXECUTION DEVICE

Robert Cramer and August C. Orthmann, Milwaukee, Wis.

Application April 5, 1934, Serial No. 719,141

11 Claims. (Cl. 43—125)

This invention relates to an apparatus adapted for the purpose of humanely executing animals such as dogs, cats, or the like.

One of the objects of the present invention is to effect the execution of animals with a minimum of pain, discomfort and terror and to accomplish such purposes in a practical and simple manner and with economy and convenience to the humanitarian or governmental agency performing the task.

Another important object of the invention is to carry out the execution without endangering the health or lives of the operators of the equipment and without creating any toxic or dangerous conditions in the environment in which the operation is being carried on.

In practically every community the problem of disposing of injured, sick or unwanted animals in a humane, rapid and safe manner is encountered. There are several methods used at the present time, among them drowning, electrocution, hypodermic injection of poisons and poisoning by the administration of gas. One of the best gases for this purpose is carbon monoxide, because of the ease of generation, its positive and rapid action, and because the animal so killed feels no distress or discomfort prior to the loss of consciousness.

Carbon monoxide is produced in all gasoline engines, its ratio to the other gases of combustion increasing as the air supply to the engine is decreased. The method most commonly employed in using the carbon monoxide generated by a gasoline engine for killing animals is to connect the exhaust from an automobile or truck engine directly to a tank in which the animal is placed. While this method causes loss of consciousness in most cases in less than one minute, nevertheless, considerable pain is experienced by the animal due to the heat of the exhaust and its nauseating odors, causing howling and whimpering before loss of consciousness.

Engine exhaust gas usually contains carbon dioxide in addition to the carbon monoxide. The dioxide is not poisonous, but causes distress to animals that breathe it, by suffocation. It is desirable, in order to avoid this distress, to remove the carbon dioxide from the exhaust gas by scrubbing and incidentally also to increase the relative concentration of the poisonous carbon monoxide. Also the interior of the tank is very often dark and becomes covered with a black tarry deposit condensed from the exhaust gas. All of this frightens the animal immediately when he is introduced into the chamber.

The present invention provides a clean, safe and convenient method of generating and supplying exhaust gas to a chamber for the destruction of small animals. In order to carry out this purpose a gasoline engine is provided which drives a small exhaust fan. The exhaust of this gasoline engine is connected to a scrubber in which a spray of water washes out all of the easily condensible portions of the gases of combustion and also serves to cool them. From this scrubber the gases are led through a pipe to a dual valve arrangement from which they may be diverted either into a lethal chamber or into the suction of the exhaust fan. The suction side of the exhaust fan is also connected to the chamber at a different point from that where the exhaust enters.

The dual valve arrangement mentioned above consists of one three-way cock and one plain cock so arranged with a common lever that in one position of the lever air enters through the three-way cock into the lethal chamber for the purpose of ventilating it and the exhaust gas passes through the plain cock to the suction fan inlet. In the other position of the lever the plain cock leading to the inlet of the fan is closed and the three-way cock is in such a position that the exhaust gas enters directly into the chamber.

By having the suction of the fan always directly connected to the chamber a slight vacuum with respect to the atmosphere is maintained in the entire system and therefore any danger of leakage of toxic gases to the outside is avoided, since any slight leaks in the construction of the chamber will, under these conditions, cause air to flow in.

The chamber is constructed of metal or other material welded or otherwise made gas-tight. It is desirable to have a window of glass for observation, and some form of illumination within the chamber. A door is provided for placing and removing animals from the chamber. This door, being sealed by means of a strip of rubber or other soft material and being held in a closed position by clamps, is also held tightly against its frame by outside air pressure, due to the slight suction maintained in the chamber.

Nervous reactions of animals at the moment of death include vomiting and the discharge of the intestinal contents and urine. For convenience in operation it is desirable to have the floor so constructed that it can readily be flushed out with a hose. For this reason a drain is provided which must be trapped to avoid drawing air into the chamber. Also, the drain which carries water away from the scrubber must be trapped for the same reason.

Other objects and advantages reside in certain novel features of the construction, arrangement and combination of parts which will be hereinafter more fully described and particularly pointed out in the appended claims, reference being had to the accompanying drawing forming a part of this specification, and in which:

Figure 1 is a view in elevation illustrating an apparatus embodying the present invention;

Figure 2 is a similar view looking at the apparatus from the right hand side of Figure 1;

Figures 3 and 4 are diagrammatic sectional views showing the position of the valves when carbon monoxide is being drawn into the lethal chamber; and Figures 5 and 6 are similar views showing the position of the valves when the lethal chamber is being ventilated.

Referring to the drawing, it will be seen that the present invention proposes a lethal chamber designated generally at 1 supported by legs 2 which may be constituted by extensions of the angle iron framing of the chamber. This chamber is constructed of sheet metal or any other suitable material, the walls of which are welded or otherwise so securely united as to provide an hermetically sealed or gas-tight enclosed space or chamber. One wall of the chamber may be provided with a door 5, supported by hinges 6 and equipped with a latch or closure fastener 7. The door may be equipped with a window 7ª. Suitable means is provided for effecting a hermetic or gas-tight seal between the margins of the door and the margins of the door opening. A strip of rubber designated at 6' will answer the purpose.

The bottom of the chamber 1 slopes inwardly towards its center and at the center slopes toward a trap 8 communicating with the interior of the chamber at one end of the bottom. The chamber is preferably provided with a removable slatted wooden floor indicated by dotted lines at 2' in Figure 2. The metal bottom or floor of the chamber thus slopes below the slatted floor 2' to the water sealed drain or trap 8. Hence, the chamber may be scrubbed or flushed, the trap 8 always maintaining a seal to prevent escape of gas and the entrance of unwanted air.

As previously indicated, the present invention proposes generally to introduce carbon monoxide into the chamber 1 to effect killing of the animal and then to exhaust the gas therefrom after the execution of the animal to permit of safe removal of the animal's carcass and reconditioning of the chamber.

In carrying out these purposes a light powered internal combustion (gasoline) engine 10 is provided and may be conveniently mounted on a base 11 located adjacent the chamber 1.

The exhaust gases from the engine 10 are first passed through a scrubber 12 which removes the carbon dioxide and the pungent gases and also effectively muffles the exhaust noise. As shown in the drawing, a pipe 13 connects the exhaust of engine 10 with the lower end of the cylinder 14 of the scrubber. The cylinder 14 is closed except for a water-sealed trap 15 at its lower end. A pipe 16 is connected to the upper end of the cylinder 14 and within the cylinder is provided with a spray nozzle 17. Above the cylinder the pipe 16 is provided with a valve 18. The cylinder 14 is partially filled with gravel and the exhaust gases in flowing up through the gravel encounter the downwardly flowing spray of water with the result that the easily condensed portion of the gases and the carbon dioxide are washed out and the remaining gas (carbon monoxide) cooled.

A pipe 20 leads laterally from the upper end portion of the cylinder 14 and has branches 21 and 22 leading therefrom, the branch 21 extending to the chamber 1 and preferably communicates with the interior thereof adjacent the bottom of the chamber. The branch 22 connects and communicates with a pipe 23 extending between the upper part of the chamber 1 and the suction side of a fan 24, the latter being connected to and driven by the engine 10.

The discharge side of the fan 24 connects by means of a pipe 25 with a stack or chimney (not shown).

A three-way cock 26 is provided in the branch 21 and has a squared or non-circular extension 27 projecting toward the branch 22. Similarly, a plain cock 28 is provided in the branch 22 and has a non-circular extension 29 projecting toward the extension 27 and disposed adjacent thereto so that the extensions may be conveniently and simultaneously operated from a single lever or wrench 30 (see Figure 2).

In utilizing the present invention for its intended purposes, the gasoline engine is started and allowed to run for a few minutes in order to warm up. During this time the lever 30 is moved to cause the cocks 26 and 28 to be positioned as shown in Figures 5 and 6, wherein the plain cock 28 is open, that is, has its port in registration with the opening of the pipe sections 22. In such position of the plain cock 28 the exhaust gases from the scrubber are sucked directly from the pipe 22 into the fan and blown by the fan up through the pipe 25 to the chimney. At this time the three-way cock is positioned as shown in Figure 5 and when so positioned allows air to be drawn in through the vent 26' of its casing and thence through the underlying sections of the pipe or branch 21 into the lethal chamber. It will thus be understood that the lethal chamber is in this way vented with fresh air. The animal is now placed in the chamber and the door 6 closed and secured in closed position. The air supply to the carburetor is then cut down until choking begins. Thereupon the lever 30 is shifted to cause the cocks 26 and 28 to move to the position shown in Figures 3 and 4. Communication through the pipe 22 with the suction side of the fan is now blocked, plain cock 28 being closed. Communication between the scrubber and the lethal chamber is now opened, the three-way cock being positioned as shown in Figure 3. As a consequence an atmosphere of carbon monoxide in deadly concentration is quickly built up in the lethal chamber. Within a short time death of the animal occurs. As the atmosphere in the lethal chamber contains nothing but air and scrubbed exhaust gas and as the carbon monoxide is quickly present in deadly concentration death ensues in about one minute without pain, suffering or distress. Following this, lever 30 is again shifted to return the cocks 26 and 28 to the position shown in Figures 5 and 6 to ventilate the chamber. During the operation of the chamber, that is, during the time that a carbon monoxide atmosphere is built up therein a slight suction is maintained in the chamber which has the result of more effectively sealing the door and of precluding escape of carbon monoxide to the exterior. If any leaks occur in the chamber or in the system air will be drawn in rather than carbon monoxide leaking out. The blower in the manner in which it is combined with the chamber and with the piping arrangement has this advantage and it also provides a load for the engine. The latter is also advantageous in that the engine exhausts more carbon monoxide gas when operating under a load.

After the chamber has been ventilated the door 6 may be opened and the animal's carcass removed and the chamber flushed out with a hose or scrubbed to recondition it for further use. If desired, the light 35 may be provided within the chamber. It is also contemplated that the interior of the chamber may be brightly painted.

While we have shown and described one construction in which the invention may be embodied, it is to be understood that this construction has been selected merely for the sake of illustration or example, and that various changes in the size, shape and arrangement of the parts may be made without departing from the spirit of the invention or the scope of the subjoined claims.

The invention claimed is:

1. An apparatus of the character described comprising an hermetically sealed chamber, an internal combustion engine, a blower driven by said engine, means connecting the suction side of said blower with said chamber, a gas scrubber, a connection between the exhaust of the gasoline engine and said gas scrubber, and a pipe line connected to the discharge of the scrubber and having branches, one connected to the interior of the chamber and the other connected to the suction side of said blower, and valves in said branches.

2. An apparatus of the character described comprising an hermetically sealed chamber, an internal combustion engine, a blower driven by said engine, means connecting the suction side of said blower with said chamber, a gas scrubber, a connection between the exhaust of the gasoline engine and said gas scrubber, and a pipe line connected to the discharge of the scrubber and having branches, one connected to the interior of the chamber and the other connected to the suction side of said blower, and valves in said branches, the valve in the branch leading to the lethal chamber being a three-way valve for selectively establishing communication between the scrubber and the chamber or between the chamber and the atmosphere.

3. An apparatus of the character described comprising an hermetically sealed chamber, an internal combustion engine, a blower driven by said engine, means connecting the suction side of said blower with said chamber, a gas scrubber, a connection between the exhaust of the gasoline engine and said gas scrubber and a pipe line connected to the discharge of the scrubber and having branches, one connected to the interior of the chamber and the other connected to the suction side of said blower, and valves in said branches, the valve in the branch leading to the lethal chamber being a three-way valve for selectively establishing communication between the scrubber and the chamber or between the chamber and the atmosphere, in combination with means for co-ordinately actuating said valves to insure opening of the branch connecting the scrubber with the suction side of the fan upon closing of said other branch and venting of the lethal chamber therethrough to the atmosphere and also to insure closing of the branch connecting the scrubber to the suction side of the fan upon the establishment of communication between the scrubber and the lethal chamber through the other branch.

4. An execution device for small animals comprising a lethal chamber, a fan, a connection between the suction side of the fan and the chamber whereby the fan may withdraw gas from the chamber and reduce pressure therein, a stack into which said fan discharges, a source of supply of lethal gas, and valve controlled connections between said source and said lethal chamber and the suction side of said fan whereby the fan may be selectively utilized upon manipulation of said valve controlled connections to build up an atmosphere of carbon monoxide gas in the chamber in sufficient concentration to destroy animal life therein or to ventilate the chamber.

5. An apparatus of the character described comprising a lethal chamber having an opening and a closure therefor, an internal combustion engine, a gas scrubber, a connection between the exhaust of the internal combustion engine and the gas scrubber, and a valve controlled connection between the scrubber and the chamber.

6. An apparatus of the character described comprising a lethal chamber, an internal combustion engine, a gas scrubber, a connection between the exhaust of the engine and the gas scrubber, a connection between the scrubber and the lethal chamber, and a suction fan connected with the chamber and operable to reduce pressure therein and to cause the flow of the carbon monoxide of the exhaust gas thereinto.

7. An apparatus of the character described comprising a lethal chamber, an internal combustion engine, a gas scrubber, a connection between the exhaust of the engine and the gas scrubber, a connection between the scrubber and the lethal chamber, a suction fan connected with the chamber and operable to reduce pressure therein and to cause the flow of the carbon monoxide of the exhaust gas thereinto, in combination with a stack, and means operable at will for utilizing the suction of the fan to divert the carbon monoxide from the scrubber to the stack.

8. An apparatus of the character described comprising a lethal chamber, an internal combustion engine, a gas scrubber, a connection between the exhaust of the engine and the gas scrubber, a connection between the scrubber and the lethal chamber, a suction fan connected with the chamber and operable to reduce pressure therein and to cause the flow of the carbon monoxide of the exhaust gas thereinto, in combination with a stack, means operable at will for utilizing the suction of the fan to divert the carbon monoxide from the scrubber to the stack, and a valve in the connection between the scrubber and the chamber operable to allow fresh air to flow into the chamber under the influence of the suction when the carbon monoxide is diverted from the scrubber to the stack.

9. An apparatus of the character described comprising an internal combustion engine, a gas scrubber, a connection between the gas scrubber and the exhaust of the internal combustion engine, a connection between the gas scrubber and the chamber, a fan actuated by said engine, a connection between the suction side of the fan and the lethal chamber, and means for carrying off the discharge of the fan.

10. An apparatus of the character described comprising a lethal chamber, an internal combustion engine, a blower operatively connected to said engine so as to be actuated whenever the engine is running, a permanent connection between the chamber and the suction side of the blower so that the blower draws gas from the chamber and tends to reduce pressure therein whenever it is running, and valve controlled connections between the chamber, the atmosphere and the exhaust of said engine whereby the suction exerted in the chamber by the blower may be selectively utilized to ventilate the chamber and to charge the same with the exhaust of said engine.

11. An apparatus of the character described comprising an hermetically sealed chamber, an internal combustion engine, a blower driven by the engine, means connecting the suction side of said blower with said chamber, a pipe line connected up with the engine to receive the exhaust therefrom and having branches, one connected to the interior of the chamber and the other connected to the suction side of the blower, valves in said branches, the valve in the branch leading to the chamber being a three-way valve, said valves having operating elements disposed closely adjacent each other, and a single operating lever connected to the operating elements for both valves for co-ordinately actuating the same.

AUGUST C. ORTHMANN.
ROBERT CRAMER.